United States Patent
Lin et al.

(10) Patent No.: US 10,511,235 B1
(45) Date of Patent: Dec. 17, 2019

(54) INVERTER APPARATUS AND METHOD OF CONTROLLING THE SAME

(71) Applicant: DELTA ELECTRONICS, INC., Taoyuan (TW)

(72) Inventors: Chiao-Chien Lin, Taoyuan (TW); Yung-Sheng Yan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/222,063

(22) Filed: Dec. 17, 2018

(30) Foreign Application Priority Data

Jul. 27, 2018 (CN) .......................... 2018 1 0843550

(51) Int. Cl.
*H02M 7/5387* (2007.01)
*H02M 7/537* (2006.01)
*H02M 7/48* (2007.01)

(52) U.S. Cl.
CPC ......... *H02M 7/537* (2013.01); *H02M 7/4807* (2013.01)

(58) Field of Classification Search
CPC ............................ H02M 5/4585; H02M 7/537
USPC .................. 363/37, 40, 89, 97, 98, 131, 132
See application file for complete search history.

(56) References Cited

U.S. PATENT DOCUMENTS

| 7,245,508 | B2 * | 7/2007 | Tokuda | ............... H02M 5/4585 363/132 |
| 9,071,141 | B2 * | 6/2015 | Dong | .................. H02M 3/1582 |
| 9,246,411 | B2 * | 1/2016 | Tallam | ................ H02M 5/4585 |
| 9,705,362 | B2 * | 7/2017 | Fujita | .................... H02M 5/297 |
| 2006/0072353 | A1 * | 4/2006 | Mhaskar | ............ H02M 5/4585 363/80 |
| 2008/0186004 | A1 * | 8/2008 | Williams | ............ H01L 29/8128 323/282 |
| 2009/0003024 | A1 * | 1/2009 | Knaup | .................. H02M 7/483 363/124 |
| 2013/0070504 | A1 * | 3/2013 | Xu | ...................... H02M 7/5388 363/132 |
| 2013/0235628 | A1 * | 9/2013 | Dong | .................... H02M 7/797 363/47 |
| 2013/0272045 | A1 * | 10/2013 | Soeiro | ................... H02M 7/537 363/131 |

* cited by examiner

*Primary Examiner* — Rajnikant B Patel
(74) *Attorney, Agent, or Firm* — Muncy, Geissler, Olds & Lowe, P.C.

(57) ABSTRACT

An inverter apparatus includes a first switch, a second switch, a third switch, a fourth switch, a load detection unit, and a control unit. The first switch and the fourth switch form a first switch assembly, and the second switch and the third switch form a second switch assembly. The control unit selects a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off.

13 Claims, 18 Drawing Sheets

INVERTER APPARATUS AND METHOD OF CONTROLLING THE SAME

BACKGROUND

Technical Field

The present disclosure relates to an inverter apparatus and a method of controlling the same, and more particularly to an inverter apparatus capable of providing different modulation controls based on load operation states and a method of controlling the same.

Description of Related Art

The statements in this section merely provide background information related to the present disclosure and do not necessarily constitute prior art.

The drive control of an inverter is commonly implemented by a pulse-width modulation (PWM) signal generated by a modulating signal and a carrier signal.

Although the PWM drive control can increase the efficiency of the inverter, the existing PWM drive control usually provides high-frequency switching to control switching elements of the inverter through a single PWM modulation. In order to provide interactive controls between different PWM modulations in response to different load operation states, the complex PWM control is inevitable, and even the additional feedback control is necessary to increase the efficiency of the inverter. In other words, the existing PWM drive control fails to achieve high efficiency and good total harmonic distortion (THD %) at full-load range in a more economical and simple manner. Correspondingly, the switch elements fail to be selected and used for reduction of the specification, thereby lack of flexibility and freedom of the circuit design and unable to reduce circuit costs.

SUMMARY

An objective of the present disclosure is to provide an inverter apparatus to solve the above-mentioned problem that switching losses of switch elements cannot be effectively reduced so that the overall efficiency cannot be increased.

In order to achieve the above-mentioned objective, the inverter apparatus converts a DC input voltage into an AC output voltage for supplying power to a load. The inverter apparatus includes a first switch, a second switch, a third switch, a fourth switch, a load detection unit, and a control unit. The first switch and the fourth switch form a first switch assembly, and the second switch and the third switch form a second switch assembly. The load detection unit detects an operation condition of the load and provides a load signal. The control unit receives the load signal and provides a plurality of control signals to correspondingly control the switches. The control unit selects a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off according to the load signal.

Accordingly, the inverter apparatus is provided to effectively reduce switching losses of switch elements so that the overall efficiency can be increased and the output of the inverter apparatus meets the requirement of low total harmonic distortion.

Another objective of the present invention is to provide a method of controlling an inverter apparatus to solve the above-mentioned problem that switching losses of switch elements cannot be effectively reduced so that the overall efficiency cannot be increased.

In order to achieve the above-mentioned objective, the method of controlling the inverter apparatus which converts a DC input voltage into an AC output voltage for supplying power to a load. The inverter apparatus includes a first switch, a second switch, a third switch, and a fourth switch. The first switch and the fourth switch form a first switch assembly, and the second switch and the third switch form a second switch assembly. The method includes steps of: (a) detecting an operation condition of the load and providing a load signal; (b) receiving the load signal and providing a plurality of control signals to correspondingly control the switches; and (c) selecting a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off according to the load signal.

Accordingly, the method of controlling the inverter apparatus is provided to effectively reduce switching losses of switch elements so that the overall efficiency can be increased and the output of the inverter apparatus meets the requirement of low total harmonic distortion.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
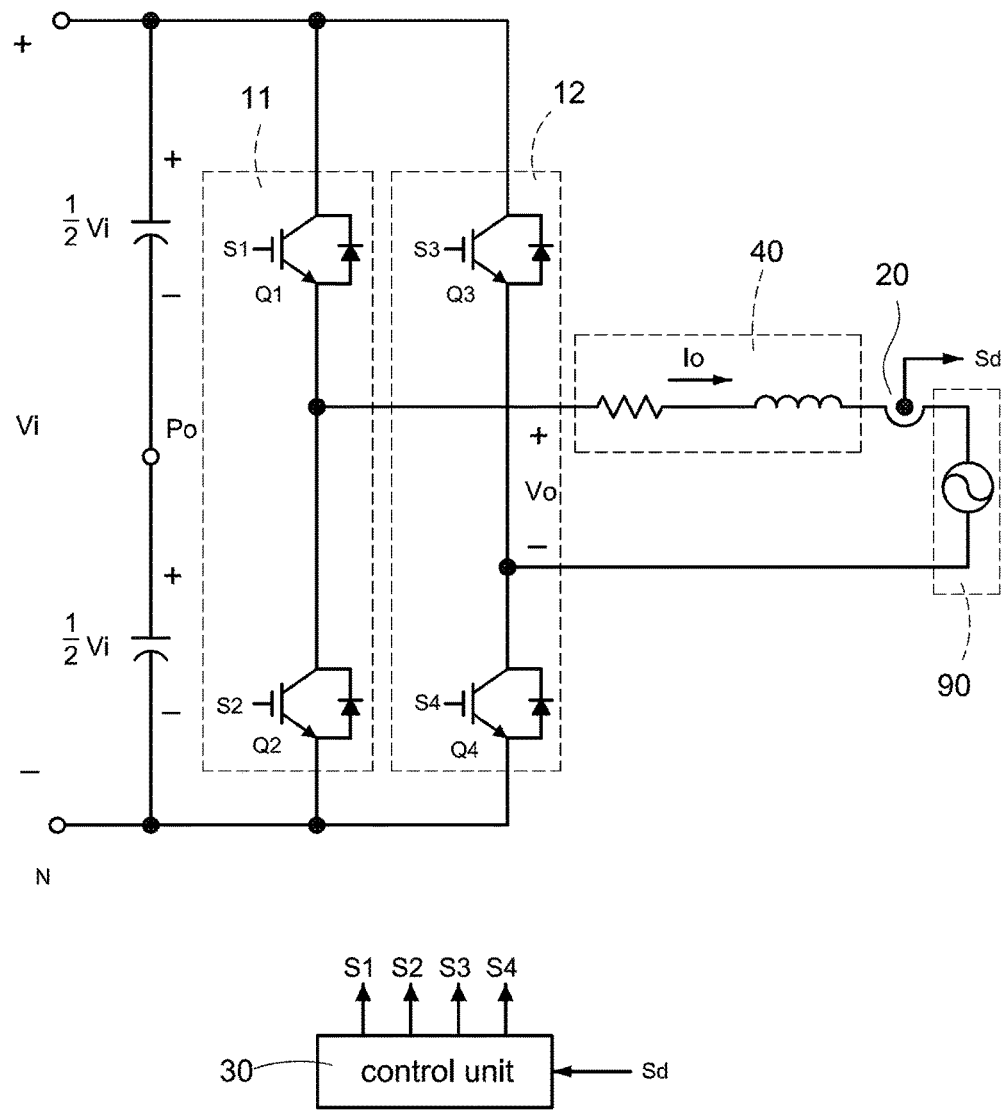
FIG. 1 is a circuit diagram of an inverter apparatus according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1. An inverter apparatus of the present disclosure is a full-bridge inverter apparatus, which converts a DC input voltage Vi into an AC output voltage Vo for supplying power to a load 90. Moreover, an output side of the full-bridge inverter apparatus provides a filter 40 for filtering the AC output voltage Vo. In an input side of the full-bridge inverter apparatus, two input capacitors are provided to receive the DC input voltage Vi. In particular, the two input capacitors are coupled at a neutral point Po so that a voltage across one of the two input capacitors is equal to half of the DC input voltage Vi. Moreover, the filter 40 provided at an output side of the full-bridge inverter apparatus is not limited by the embodiment shown in FIG. 1, i.e., an L-C filter can be also implemented.

The full-bridge inverter apparatus includes two switch bridge arms 11,12, a load detection unit 20, and a control unit 30. The switch bridge arms 11,12 having switches Q1, Q2 and switches Q3, Q4 are coupled in parallel to receive the DC input voltage Vi.

The load detection unit 20 is coupled to the load 90, and detects an operation condition of the load 90 and provides a load signal Sd. For example, the load detection unit 20 may be a current sensor for sensing an output current flowing through the load 90 to determine the operation condition of the load 90 and decide a control mode of operating the inverter apparatus according to the operation condition. For example but not limited to, 30% rated load is a determination for changing control modes. For different circuit designs and applications, however, the current sensor is not limited to be used as the load detection unit 20. In particular, the installation position of the load detection unit 20 is not limited by the embodiment shown in FIG. 1. That is, the load detection unit 20 may be installed at the front side of the filter 40 (in comparison with FIG. 1) or the load detection unit 20 may be installed at any one of the two switch bridge arms 11,12 for detecting current information and sending the current information to the control unit 30.

Moreover, a load hysteresis zone is introduced to buffer determining the operation condition of the load 90 as well as 30% rated load for determining control modes. It is assumed that the load hysteresis zone is, for example but not limited to, 2% load range, and it may be appropriately designed or adjusted according to the actual circuit controls. Hence, one control mode is determined when the loading is greater than or equal to 31% rated load, and another control mode is determined when the loading is less than or equal to 29% rated load. In other words, the load hysteresis zone between 29% and 31% rated load is the buffer range, which is introduced to reduce the sensitivity of changing control modes due to the loading variation.

For example, when the loading continuously increases from below 29% rated load to above 29% rated load but below 31% rated load, the existing control mode is still performed by the control unit 30. Similarly, when the loading continuously decreases from above 31% rated load to below 31% rated load but above 29% rated load, the existing control mode is still performed by the control unit 30. In comparison with the fixed load percentage, such as 30% rated load, the load hysteresis zone is introduced to reduce the sensitivity of changing control modes due to the loading variation. For example, when the load 90 varies around 30% rated load, the load hysteresis zone is introduced to buffer frequently changing control modes due to the loading variation. The load signal Sd contains information of the operation condition of the load 90 after the load detection unit 20 detects the load 90, and therefore the operation condition of the load 90 can be realized according to the load signal Sd.

After receiving the load signal Sd and determining the operation condition of the load 90 according to the load signal Sd, the control unit 30 provides control signals to correspondingly control switches, thereby controlling the full-bridge inverter apparatus. In addition, it is not limited to use only one operation condition of the load 90 for changing the control modes of operating the inverter apparatus, i.e., two or more than two operation conditions of the load 90 may be used for changing the control modes of operating the inverter apparatus. For example, one control mode is performed at the 30% rated load, and another control mode is performed at the 80% rated load. A more detailed description of the switch control will be made as follows.

Figure 2:
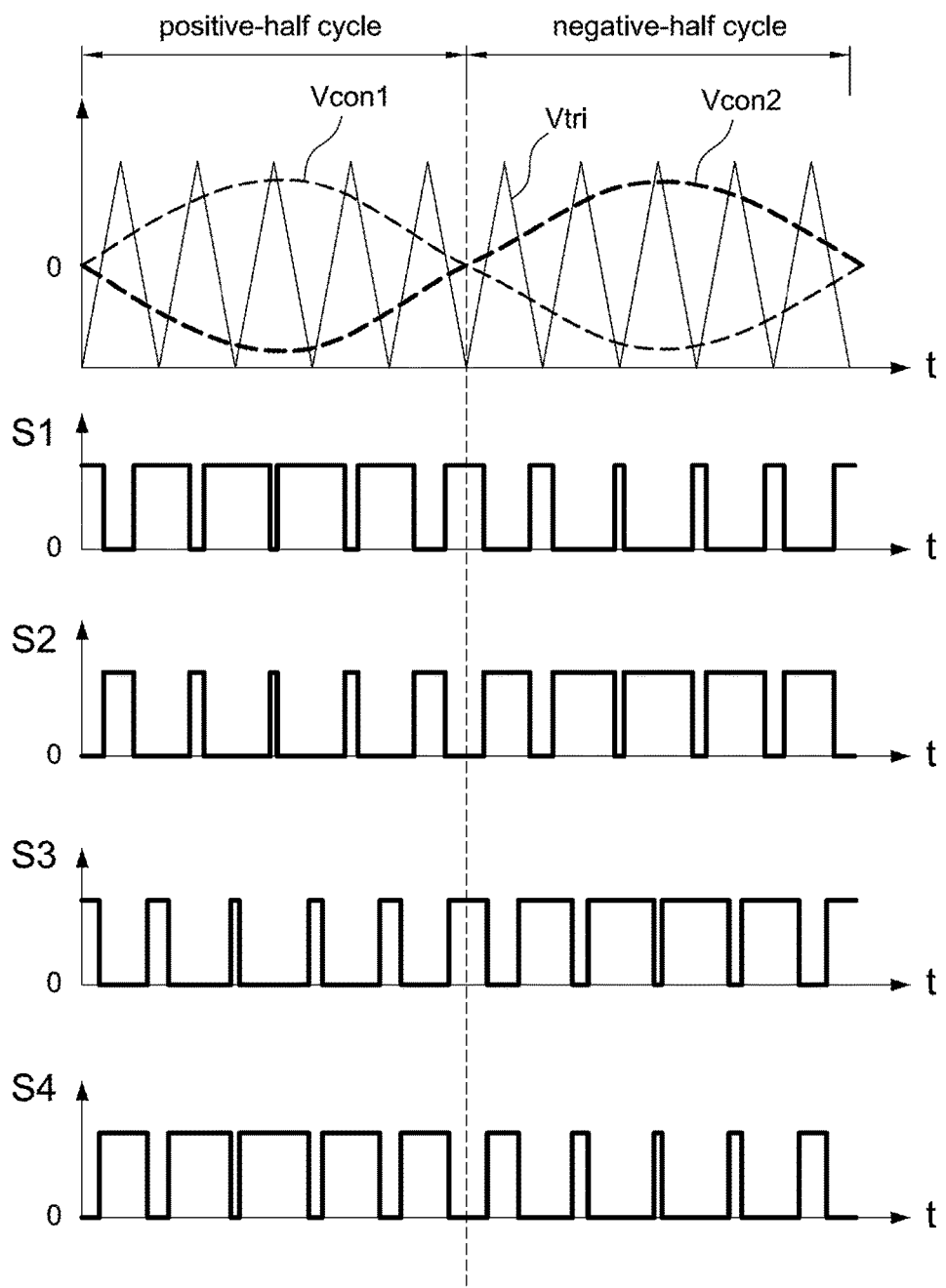
FIG. 2 is a schematic waveform of a switch control of the inverter apparatus according to a first embodiment of the present disclosure.

Please refer to FIG. 2 and also refer to FIG. 1. The two switch bridge arms 11,12 of the full-bridge inverter apparatus are a first switch bridge arm 11 and a second switch bridge arm 12. The first switch bridge arm 11 has a first switch Q1 and a second switch Q2, and the second switch bridge arm 12 has a third switch Q3 and a fourth switch Q4. The first switch Q1 and the fourth switch Q4 form a first switch assembly, and the second switch Q2 and the third switch Q3 form a second switch assembly. The AC output voltage Vo is provided between a common-connected point of the first switch Q1 and the second switch Q2 and a common-connected point of the third switch Q3 and the fourth switch Q4. The control unit 30 provides a first control signal S1 to control the first switch Q1, a second control signal S2 to control the second switch Q2, a third control signal S3 to control the third switch Q3, and a fourth control signal S4 to control the fourth switch Q4.

As shown in FIG. 2, the control signals S1-S4 are PWM signals, which are generated by a first modulation wave Vcon1, a second modulation wave Vcon2, and a carrier wave Vtri. In one embodiment, the first modulation wave Vcon1 and the second modulation wave Vcon2 are sinusoidal waves, and the carrier wave Vtri is a triangular wave. The first control signal S1 is acquired by comparing the first modulation wave Vcon1 with the carrier wave Vtri. Specifically, when the first modulation wave Vcon1 is greater than the carrier wave Vtri, the first control signal S1 is at a high level; when the first modulation wave Vcon1 is less than the carrier wave Vtri, the first control signal S1 is at a low level. As shown in FIG. 2, the first control signal S1 is a first high-frequency switching signal. In addition, the second control signal S2 is a control signal which is complementary to the first high-frequency switching signal. Similarly, the third control signal S3 is acquired by comparing the second modulation wave Vcon2 with the carrier wave Vtri. Specifically, when the second modulation wave Vcon2 is greater than the carrier wave Vtri, the third control signal S3 is at a high level; when the second modulation wave Vcon2 is less than the carrier wave Vtri, the third control signal S3 is at a low level. As shown in FIG. 2, the third control signal S3 is a second high-frequency switching signal. In addition, the fourth control signal S4 is a control signal which is complementary to the second high-frequency switching signal. Alternatively, the level of the control signals may be opposite to that of the foregoing control signals acquired by comparing the corresponding modulation wave with the carrier wave. For example, when the modulation wave is greater than the carrier wave, the control signal is at the low level; when the modulation wave is less than the carrier wave, the control signal is at the high level. In particular, the following description is based on the control signals shown in FIG. 2, which is generated by a unipolar voltage-switching manner, however, the control signal may be also generated by a bipolar voltage-switching manner.

When the control unit 30 determines that an efficiency optimization of the control mode is unnecessary according to the load signal Sd, such as below 30% rated load, the control unit 30 provides the first control signal S1 to be the first high-frequency switching signal, the third control signal S3 to be the second high-frequency switching signal, the second control signal S2 to be the switching signal which is complementary to the first high-frequency switching signal, and the fourth control signal S4 to be the switching signal which is complementary to the second high-frequency switching signal. Accordingly, the output waveform can be maintained as a sinusoidal waveform under the light-loading operation to have a good total harmonic distortion (THD %).

As the loading increases, the efficiency optimization control is performed based on maintaining the output waveform with high quality to reduce the number of the switch element operated in the high-frequency switching as well as increase the efficiency of the inverter.

Figure 3A:
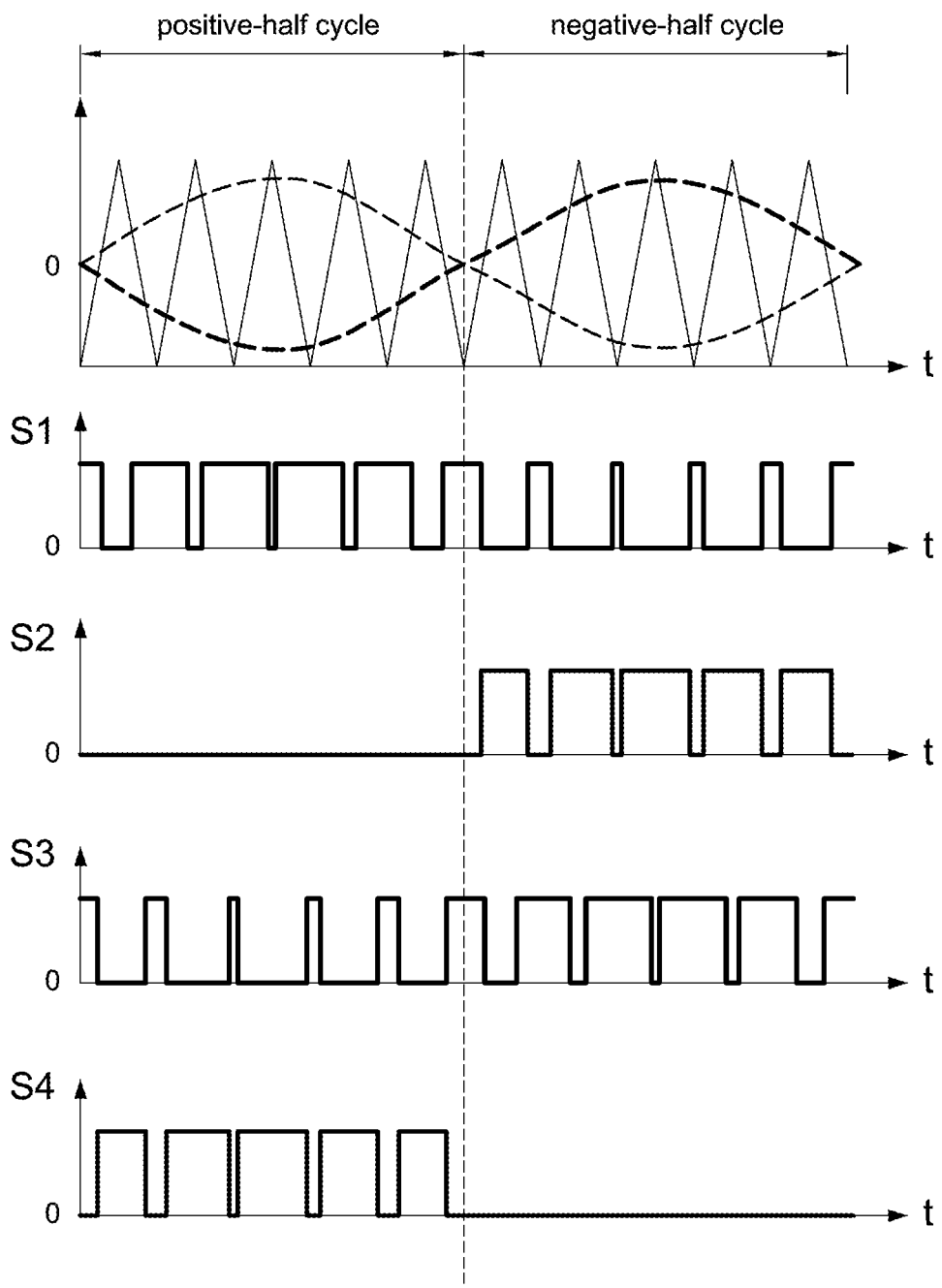
FIG. 3A is a schematic waveform of the switch control of the inverter apparatus according to a second embodiment of the present disclosure.
Figure 3B:
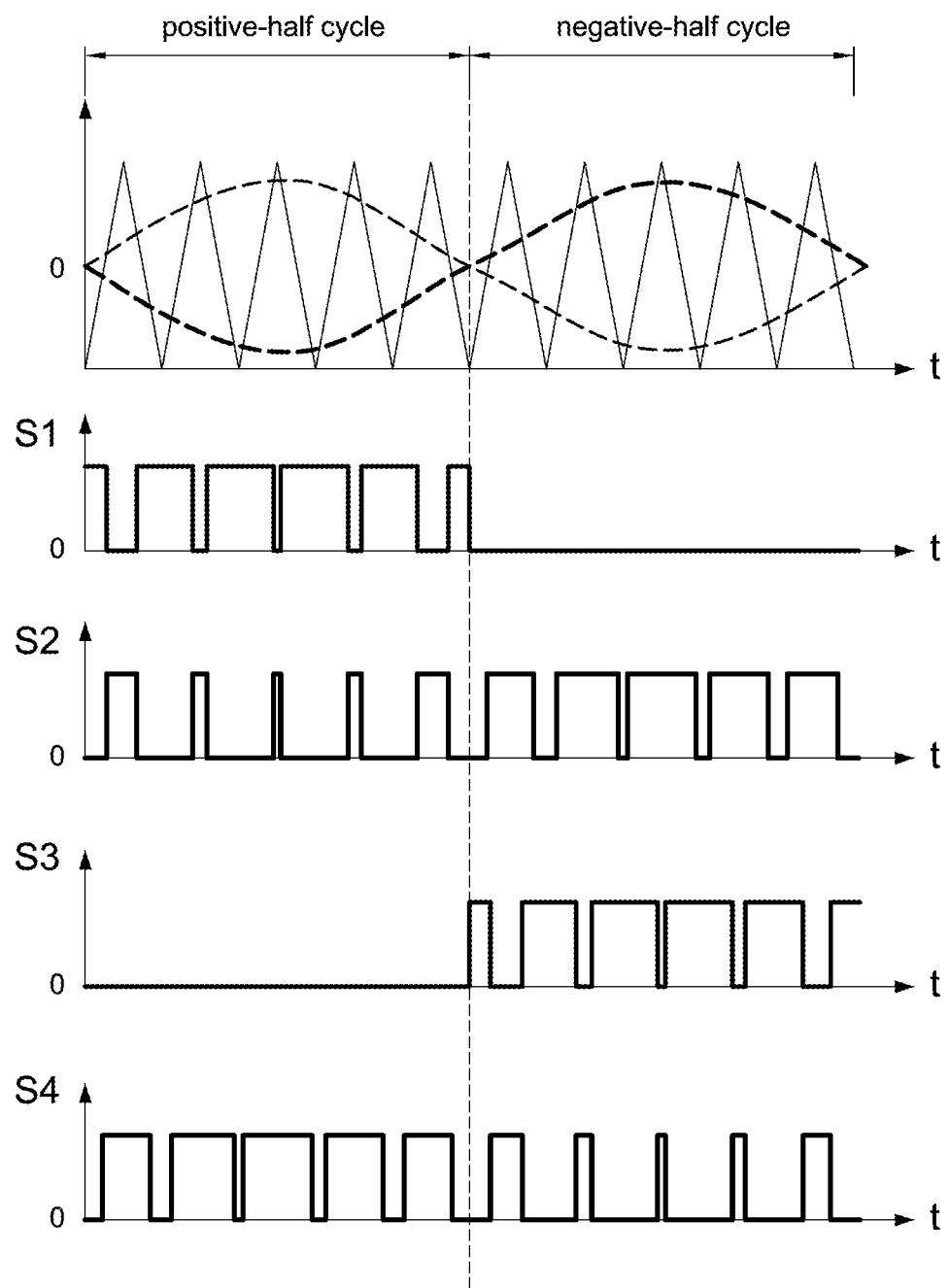
FIG. 3B is a schematic waveform of the switch control of the inverter apparatus according to a third embodiment of the present disclosure.
Figure 3C:
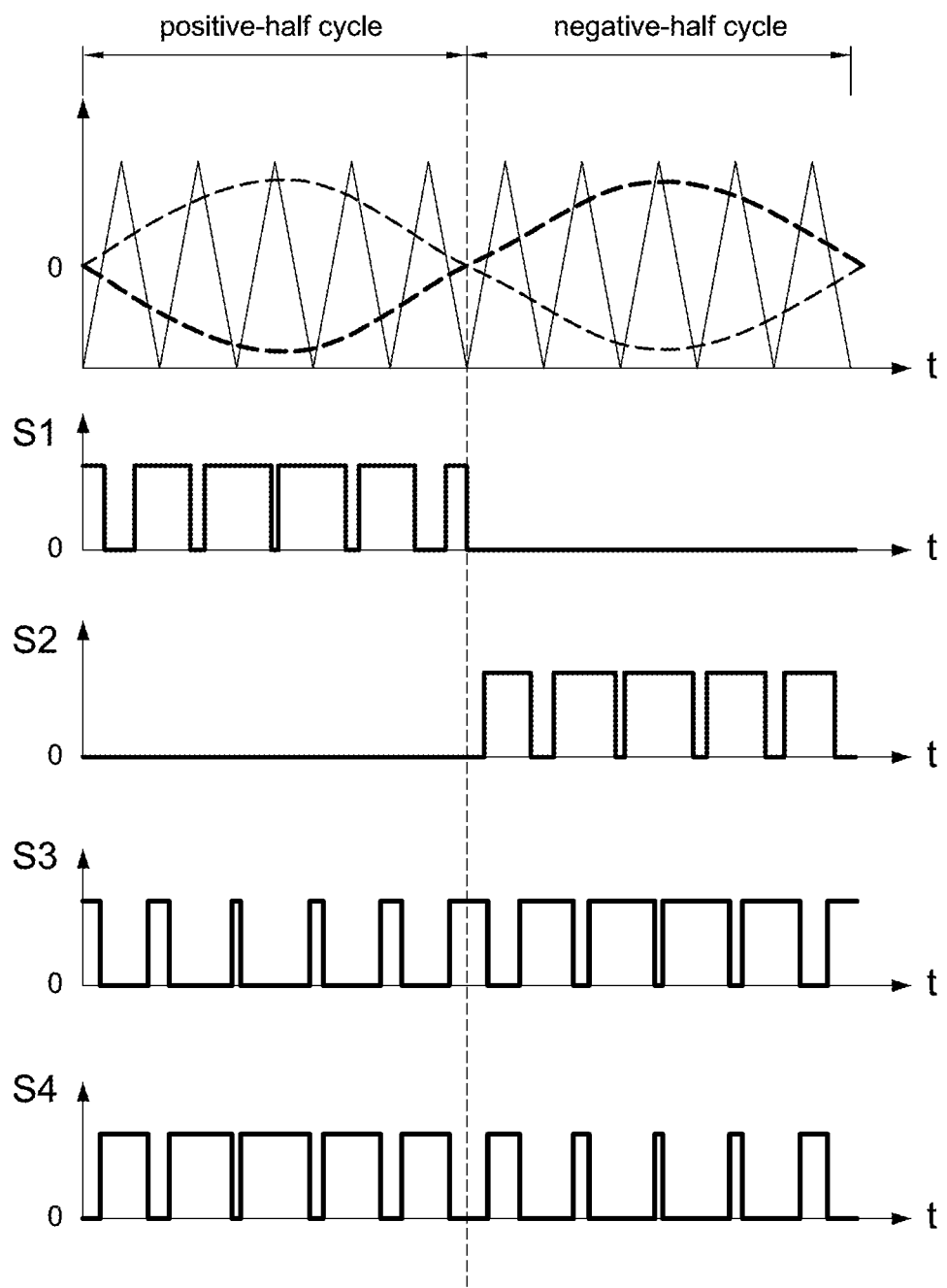
FIG. 3C is a schematic waveform of the switch control of the inverter apparatus according to a fourth embodiment of the present disclosure.
Figure 3D:
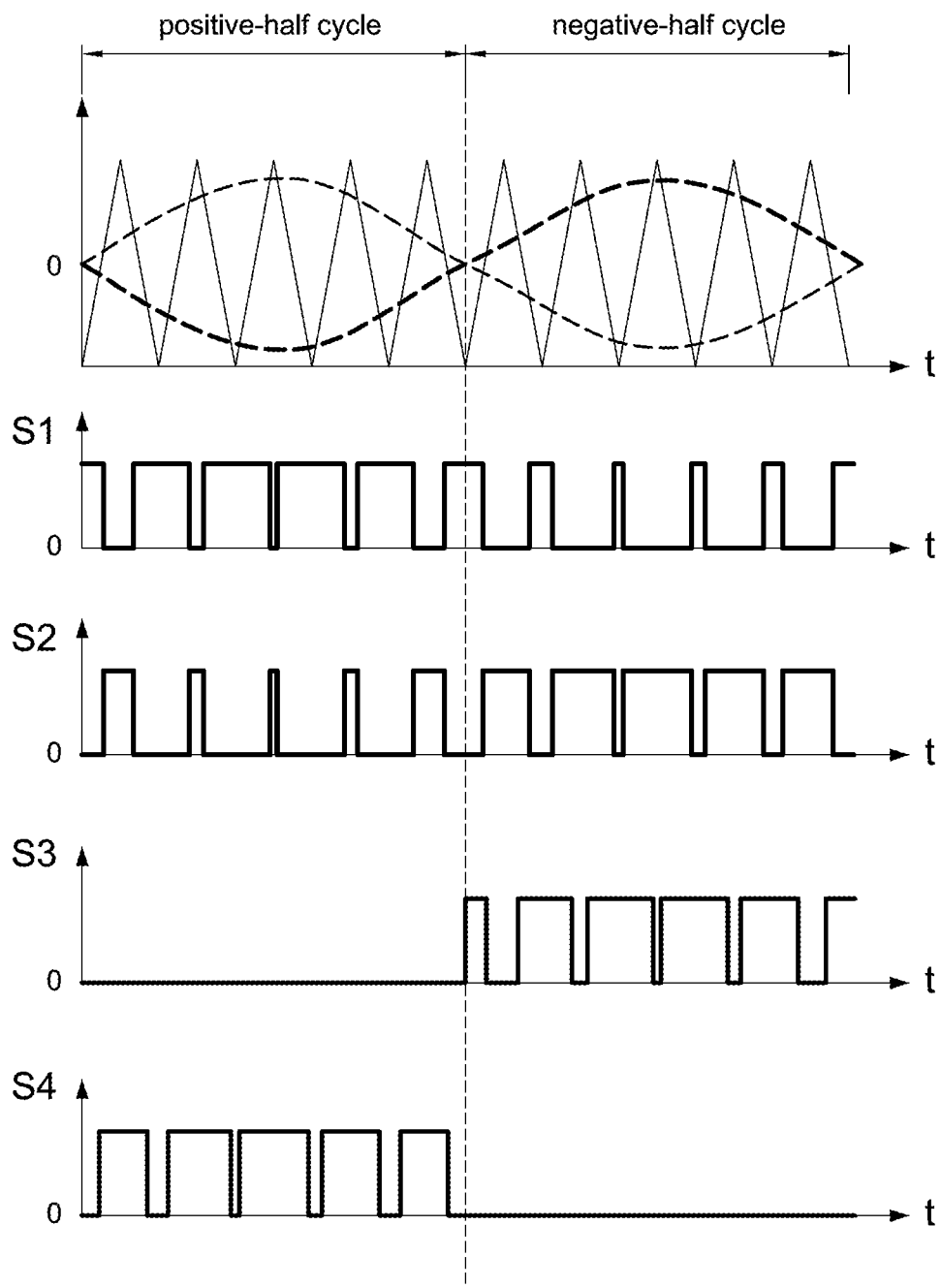
FIG. 3D is a schematic waveform of the switch control of the inverter apparatus according to a fifth embodiment of the present disclosure.

As shown in FIG. 3A, in comparison with FIG. 2, the second control signal S2 is the turned-off signal in the positive-half cycle operation, and the fourth control signal S4 is the turned-off signal in the negative-half cycle operation. As shown in FIG. 3B, in comparison with FIG. 2, the third control signal S3 is the turned-off signal in the positive-half cycle operation, and the first control signal S1 is the turned-off signal in the negative-half cycle operation. As shown in FIG. 3C, in comparison with FIG. 2, the second control signal S2 is the turned-off signal in the positive-half cycle operation, and the first control signal S1 is the turned-off signal in the negative-half cycle operation. As shown in FIG. 3D, in comparison with FIG. 2, the third control signal S3 is the turned-off signal in the positive-half cycle operation, and the fourth control signal S4 is the turned-off signal in the negative-half cycle operation.

In summary, the control modes shown in FIG. 3A-FIG. 3D are efficiency-optimized controls. The two switches of the first switch assembly are still in the high-frequency switching as shown in FIG. 2, and one switch of the second switch assembly is turned off and the other switch of the second switch assembly is in the high-frequency switching, or the two switches of the second switch assembly are still in the high-frequency switching as shown in FIG. 2, and one switch of the first switch assembly is turned off and the other switch of the first switch assembly is in the high-frequency switching. Moreover, the high-frequency switching signals shown in FIG. 2 can be masked or modified by external controls, firmware programming manner, or similar manners to make those as the turned-off signals shown in FIG. 3A-FIG. 3D.

In particular, in the switch controls shown in FIG. 3A-FIG. 3D, FIG. 4A, and FIG. 4B, the output waveform may cause waveform distortion at the zero crossing since the PWM signal immediately changes the duty cycle thereof before the current period finishes. Therefore, the waveform distortion can be effectively improved by changing the duty cycle of the PWM signal at the end of the current period.

Figure 4A:
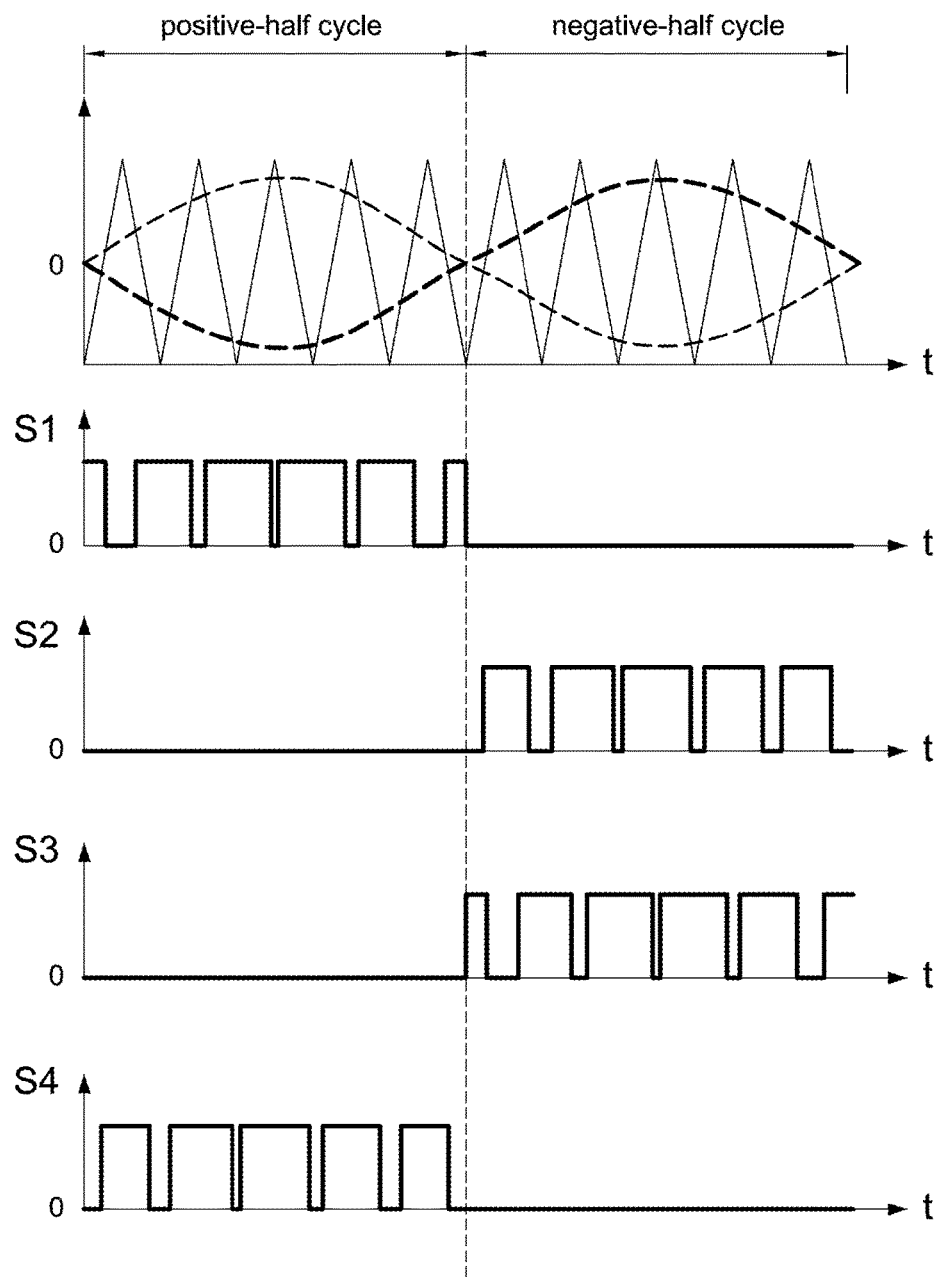
FIG. 4A is a schematic waveform of the switch control of the inverter apparatus according to a sixth embodiment of the present disclosure.

Please refer to FIG. 4A. As the loading continuously increases, for example the loading is greater than 80% rated load, the quality of the output waveform can be maintained and the efficiency of the inverter can be increased by reducing the number of the switch element operated in the high-frequency switching.

Please refer to FIG. 2 again, in order to reduce the number of the switch element operated in the high-frequency switching, the second control signal S2 and the third control signal S3 are the turned-off signals by external controls, firmware programming manner, or similar manners (not be repeated hereinafter) in the positive-half cycle operation, i.e., the second switch Q2 and the third switch Q3 of the second switch assembly are turned off, and therefore only the first switch Q1 and the fourth switch Q4 of the first switch assembly are controlled in the high-frequency switching in the positive-half cycle operation. In the negative-half cycle operation, the first switch Q1 and the fourth switch Q4 of the first switch assembly are turned off, and therefore only the second switch Q2 and the third switch Q3 of the second switch assembly are controlled in the high-frequency switching.

Figure 4B:
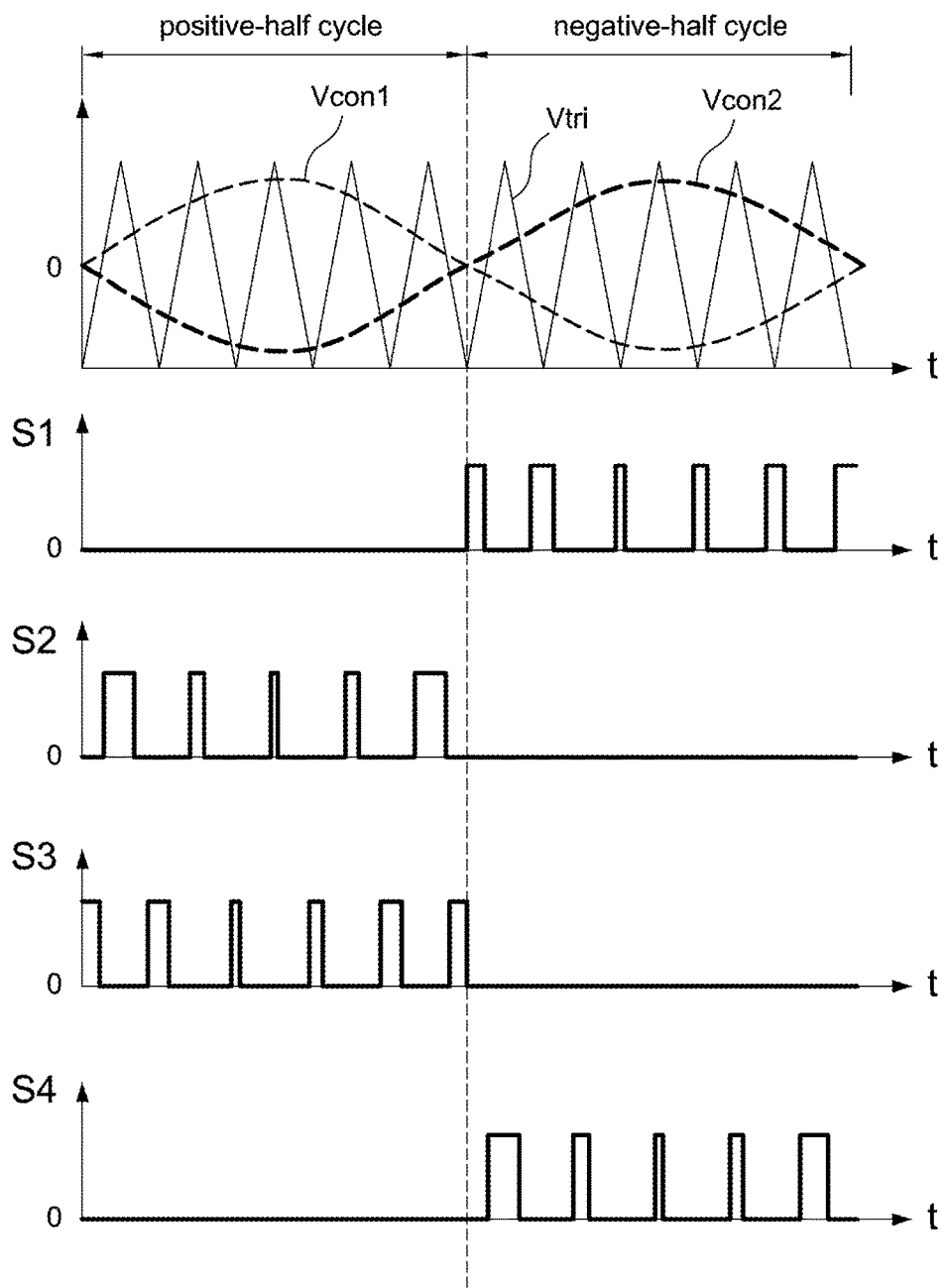
FIG. 4B is a schematic waveform of the switch control of the inverter apparatus according to a seventh embodiment of the present disclosure.

Please refer to FIG. 4B, which is another control waveform corresponding to FIG. 4A. In the positive-half cycle operation, the first control signal S1 and the fourth control signal S4 are the turned-off signals, and the second control signal S2 and the third control signal S3 are still the high-frequency switching signals shown in FIG. 2; in the negative-half cycle operation, the second control signal S2 and the third control signal S3 are the turned-off signals, and the first control signal S1 and the fourth control signal S4 are still the high-frequency switching signals shown in FIG. 2, thereby reducing the number of the switch element operated in the high-frequency switching.

In summary, during the positive-half cycle operation and the negative-half cycle operation, only two switch elements are controlled in the high-frequency switching by the control unit 30, thereby reducing the number of the switch element operated in the high-frequency switching. Accordingly, the AC output voltage Vo can be normally converted from the DC input voltage Vi to supply power to the load 90, and to reduce switching losses of switch elements and increase the overall efficiency.

Figure 5:
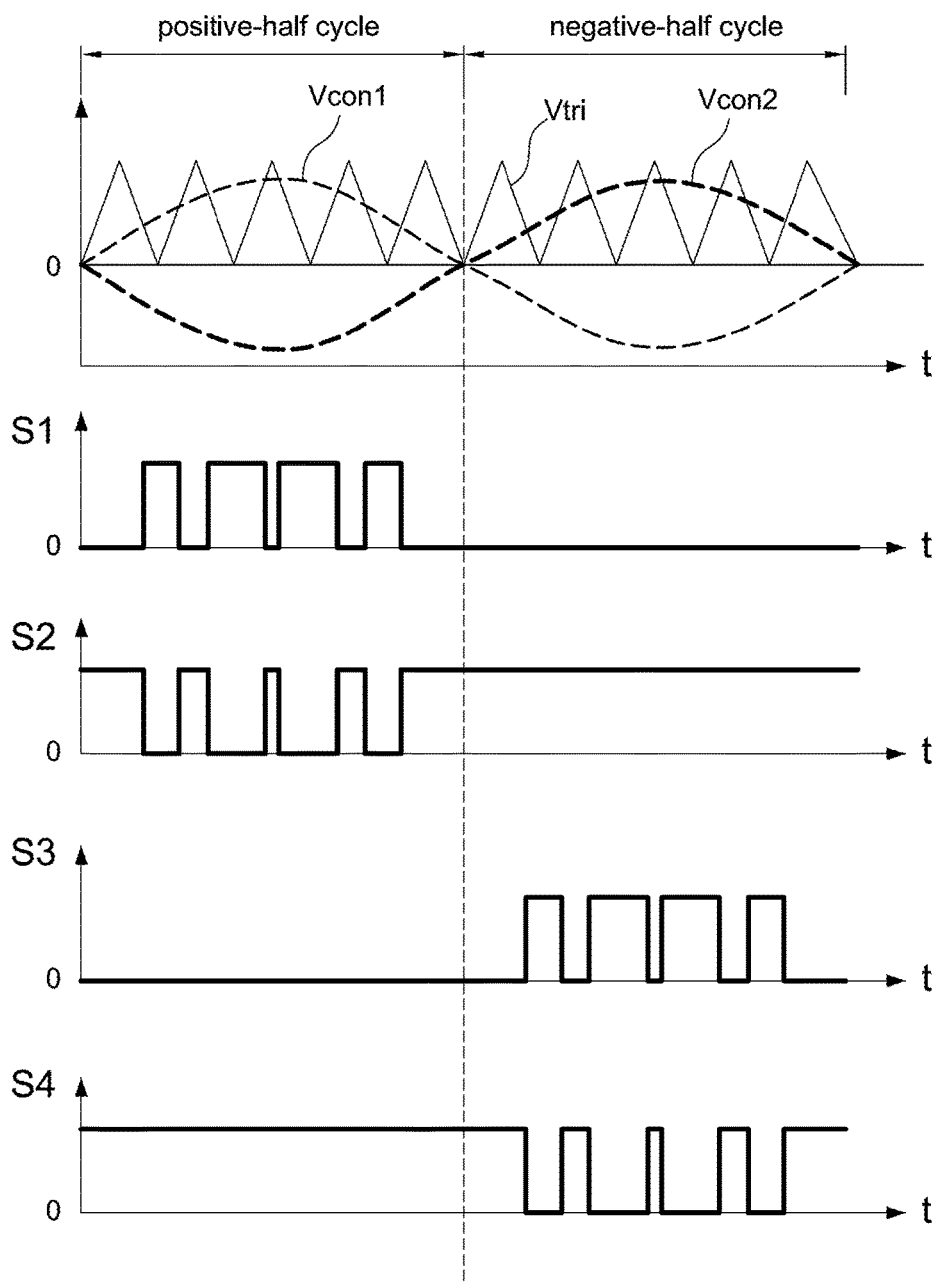
FIG. 5 is a schematic waveform of the switch control of the inverter apparatus according to an eighth embodiment of the present disclosure.

Please refer to FIG. 5, which shows another generation manner of the control signals. The control signals S1-S4 are PWM signals, which are generated by the first modulation wave Vcon1, the second modulation wave Vcon2, and the carrier wave Vtri, as described in FIG. 2. However, the major difference between FIG. 5 and FIG. 2 is that the minimum value of the carrier wave Vtri shown in FIG. 5 is zero, but the positive and negative values of the carrier wave Vtri shown in FIG. 2 is symmetrical to zero. Therefore, the control signals S1-S4 shown in FIG. 5 can be acquired by the first modulation wave Vcon1, the second modulation wave Vcon2, and the carrier wave Vtri distinguished from that shown in FIG. 2.

Please refer to FIG. 1 again, when the control unit 30 determines that the efficiency optimization of the control mode is unnecessary according to the load signal Sd, the control unit 30 provides the first control signal S1 to be a first high-frequency switching signal, the fourth control signal S4 to be a first low-frequency turned-on signal, the second control signal S2 to be a switching signal which is complementary to the first high-frequency switching signal, and the third control signal S3 to be a turned-off signal in the positive-half cycle operation. Also, in the negative-half cycle operation, the control unit 30 provides the second control signal S2 to be a second low-frequency turned-on signal, the third control signal S3 to be a second high-frequency switching signal, the first control signal S1 to be a turned-off signal, and the fourth control signal S4 to be a switching signal which is complementary to the second high-frequency switching signal. In particular, the "low frequency" mentioned in the present disclosure is, for example but not limited to, 60 Hz (or 50 Hz), and the "high frequency" is, for example but not limited to, 20 kHz or 10 kHz.

As the loading increases, the efficiency optimization control is performed based on maintaining the output waveform with high quality to reduce the number of the switch element operated in the high-frequency switching as well as increase the efficiency of the inverter.

Figure 6:
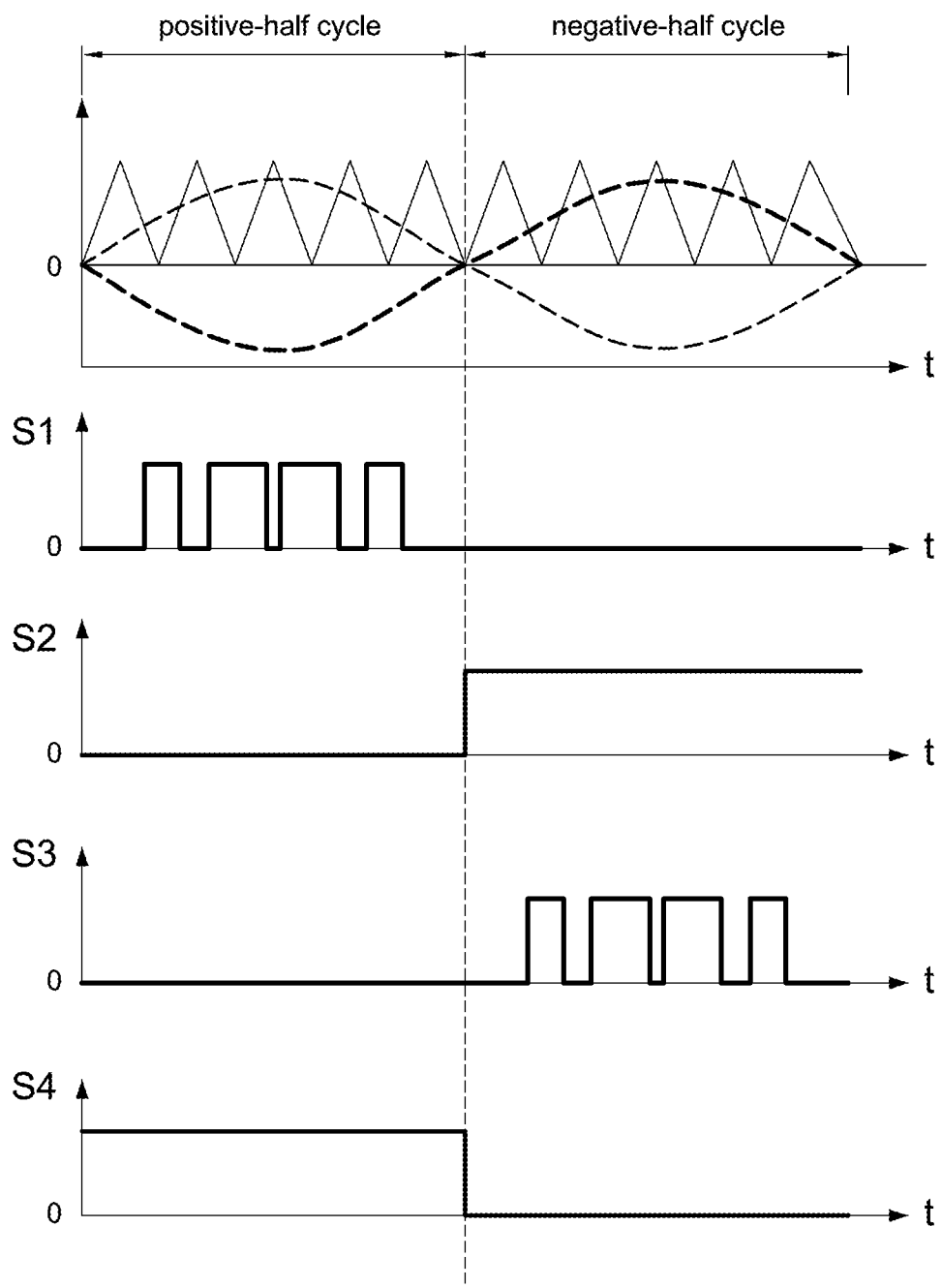
FIG. 6 is a schematic waveform of the switch control of the inverter apparatus according to a ninth embodiment of the present disclosure.

Please refer to FIG. 6. In comparison with FIG. 5, in order to reduce the number of the switch element operated in the high-frequency switching, the second control signal S2 is the turned-off signal in the positive-half cycle operation, i.e., the second switch Q2 and the third switch Q3 are turned off. In other words, only the first switch Q1 is high-frequency switched and the fourth switch Q4 is low-frequency turned on. Moreover, the fourth control signal S4 is the turned-off signal in the negative-half cycle operation, i.e., the first switch Q1 and the fourth switch Q4 are turned off. In other words, only the third switch Q3 is high-frequency switched and the second switch Q2 is low-frequency turned on.

Figure 7A:
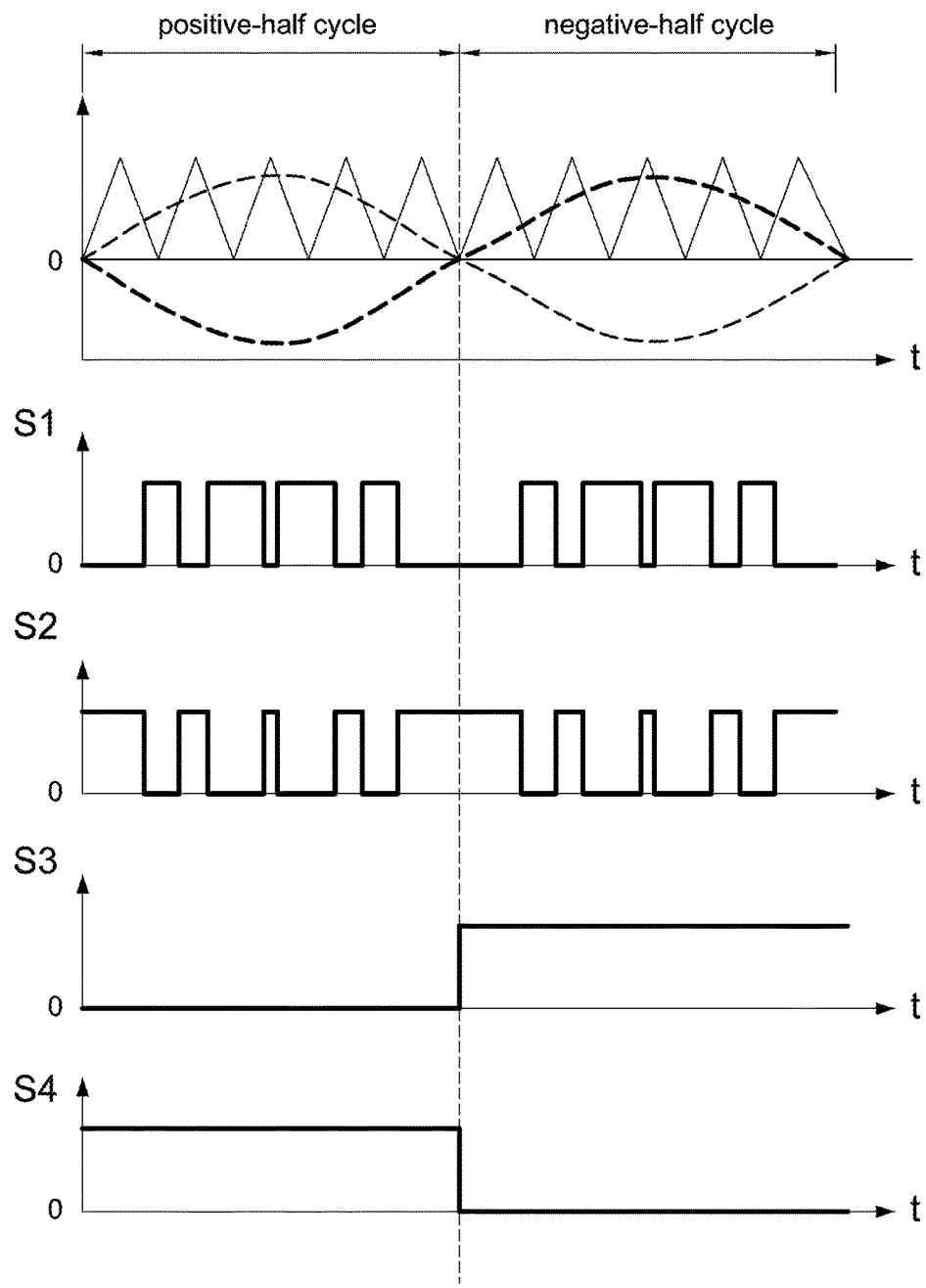
FIG. 7A is a schematic waveform of the switch control of the inverter apparatus according to a tenth embodiment of the present disclosure.

Please refer to FIG. 7A. Based on the signal control waveform shown in FIG. 5, the first control signal S1, the second control signal S2, the third control signal S3, and the fourth control signal S4 are maintained in the positive-half cycle operation. In the negative-half cycle operation, the first control signal S1 is exchanged with the third control signal S3, the second control signal S2 is exchanged with the fourth control signal S4, and further the third control signal S3 and the fourth control signal S4 are inverted. Therefore, at least one of the third control signal S3 and the fourth control signal S4 is the turned-off signal in the positive- and negative-half cycle operations. In other words, the third control signal S3 is the turned-off signal in the positive-half cycle operation, and the fourth control signal S4 is the turned-off signal in the negative-half cycle operation as shown in FIG. 7A. Further, another control signal changed from FIG. 7A is that the first control signal S1 is further exchanged with the third control signal S3, and the second control signal S2 is further exchanged with the fourth control signal S4 (not shown).

Figure 7B:
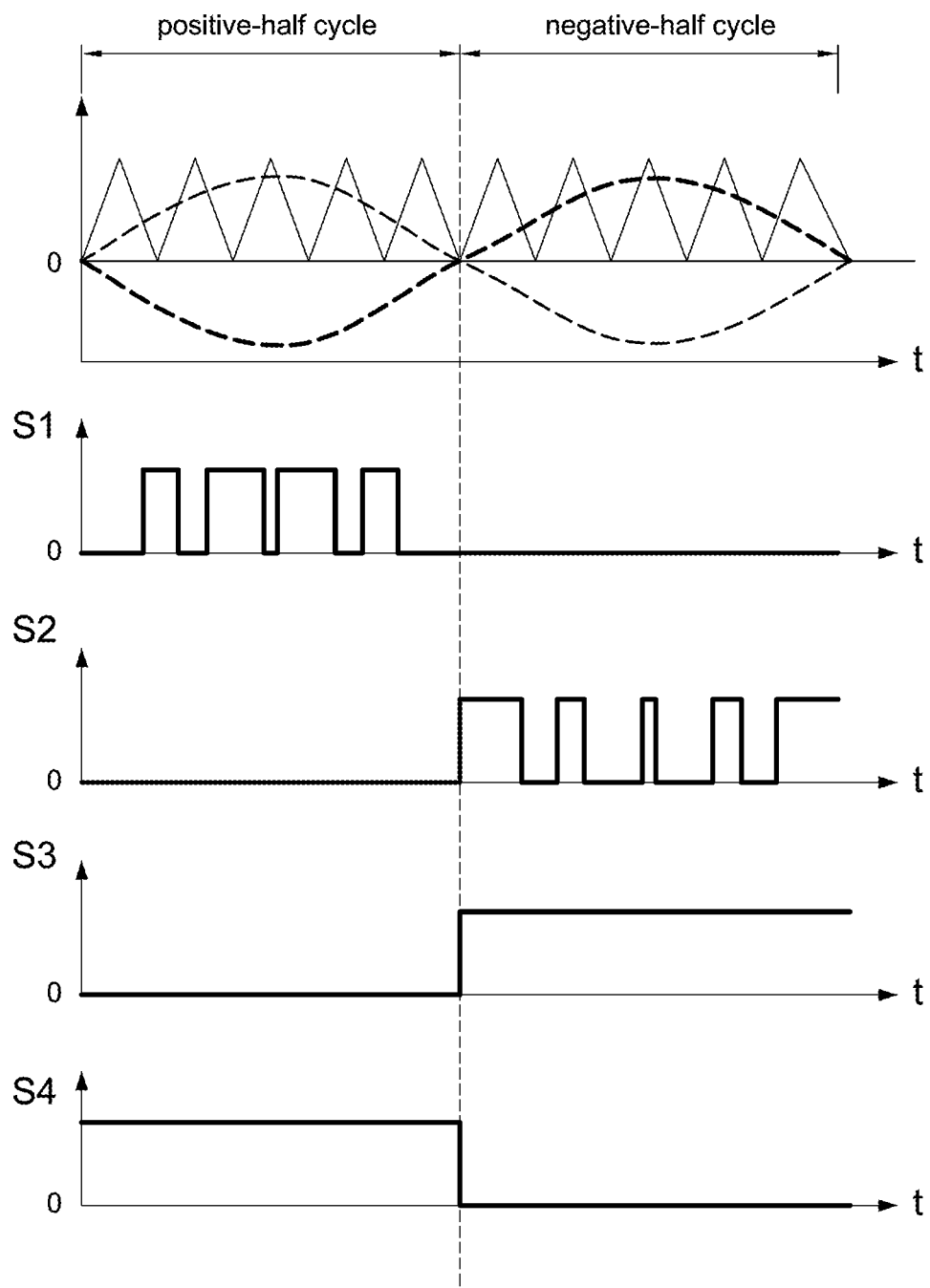
FIG. 7B is a schematic waveform of the switch control of the inverter apparatus according to an eleventh embodiment of the present disclosure.

Please refer to FIG. 7B, the control mode shown in FIG. 7B is the efficiency-optimized control in comparison with FIG. 7A. In the positive-half cycle operation, the second control signal S2 is changed from the high-frequency switching signal to the turned-off signal; in the negative-half cycle operation, the first control signal S1 is changed from the high-frequency switching signal to the turned-off signal, thereby reducing the number of the switch element operated in the high-frequency switching to achieve efficiency optimization.

Figure 8:
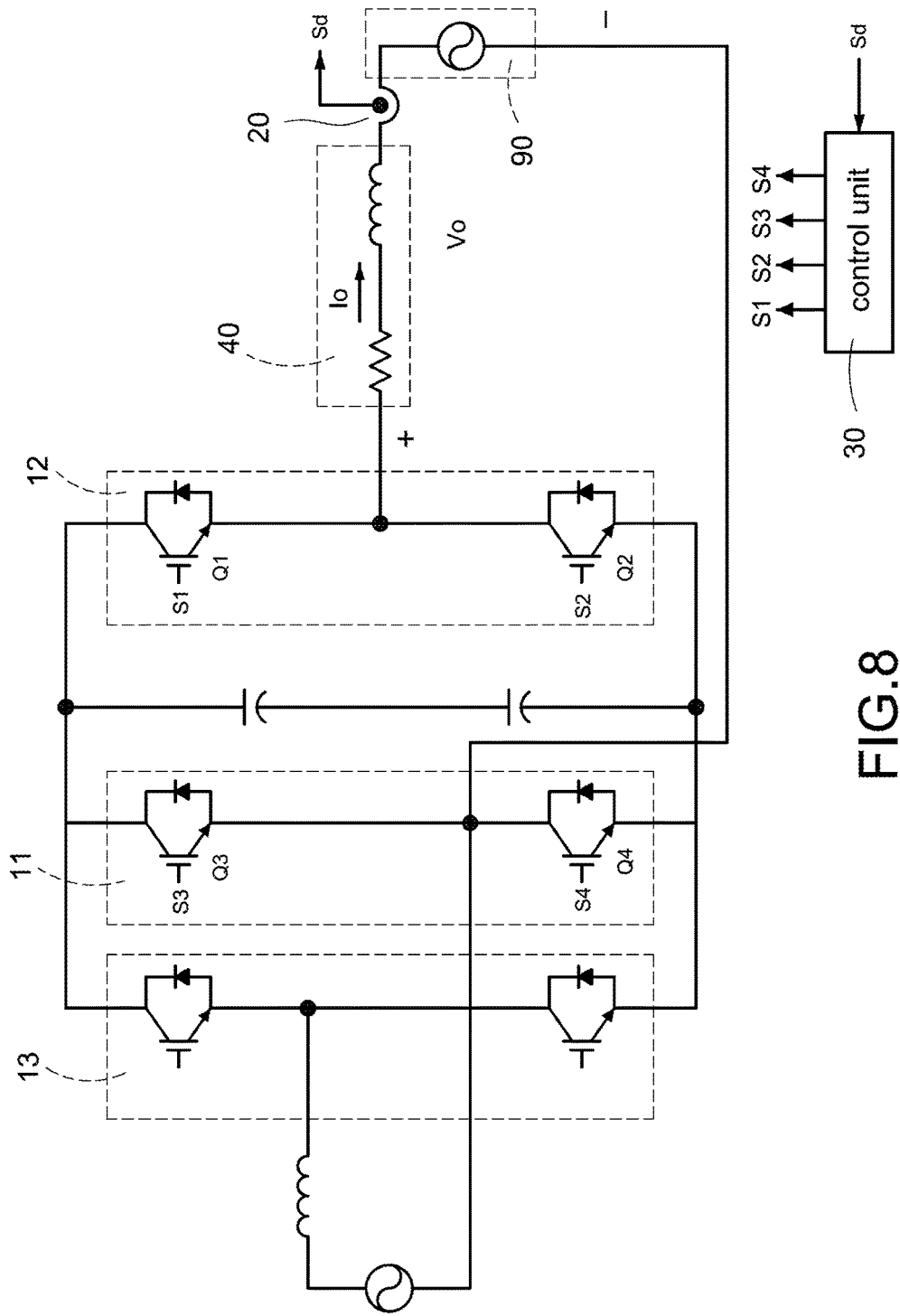
FIG. 8 is a circuit diagram of an AC-to-AC conversion apparatus with three-leg structure according to a second embodiment of the present disclosure.

Please refer to FIG. 8, which shows an AC-to-AC conversion apparatus with three-leg structure. The AC-to-AC conversion apparatus includes an AC-to-DC conversion stage, a DC-to-AC conversion stage, i.e., an inverter apparatus, a load detection unit 20, and a control unit 30. The AC-to-DC conversion apparatus is composed of a third switch bridge arm 13 and a first switch bridge arm 11, and the DC-to-AC conversion stage is composed of the first switch bridge arm 11 and a second switch bridge arm 12. In particular, the first switch bridge arm 11 is a common bridge arm of the AC-to-DC conversion stage and the inverter apparatus, and a neutral point of an AC input voltage and a neutral point of an AC output voltage are coupled to a common-connected point of the common bridge arm, i.e., the first switch bridge arm 11.

According to the operation condition of the load 90, the inverter apparatus of the AC-to-AC conversion apparatus with three-leg structure can be controlled according to the waveforms of switch control shown in FIG. 7A or FIG. 7B. Two switches (a third switch Q3 and a fourth switch Q4) of the common bridge arm, i.e., the first switch bridge arm 11 are in low-frequency operation, and also the third switch Q3 and the fourth switch Q4 of the first switch bridge arm 11 are turned off in the positive-half cycle operation and the negative-half cycle operation, respectively. Since the first switch bridge arm 11 is the common bridge arm of the AC-to-DC conversion stage and the inverter apparatus, the third switch Q3 and the fourth switch Q4 of the first switch bridge arm 11 need to be controlled to cooperate the AC input waveform so that the upper switch of the common bridge arm, i.e., the third switch Q3 is turned off when the AC input waveform is positive in the positive-half cycle, and the lower switch of the common bridge arm, i.e., the fourth switch Q4 is turned off when the AC input waveform is negative in the negative-half cycle operation.

Figure 9:
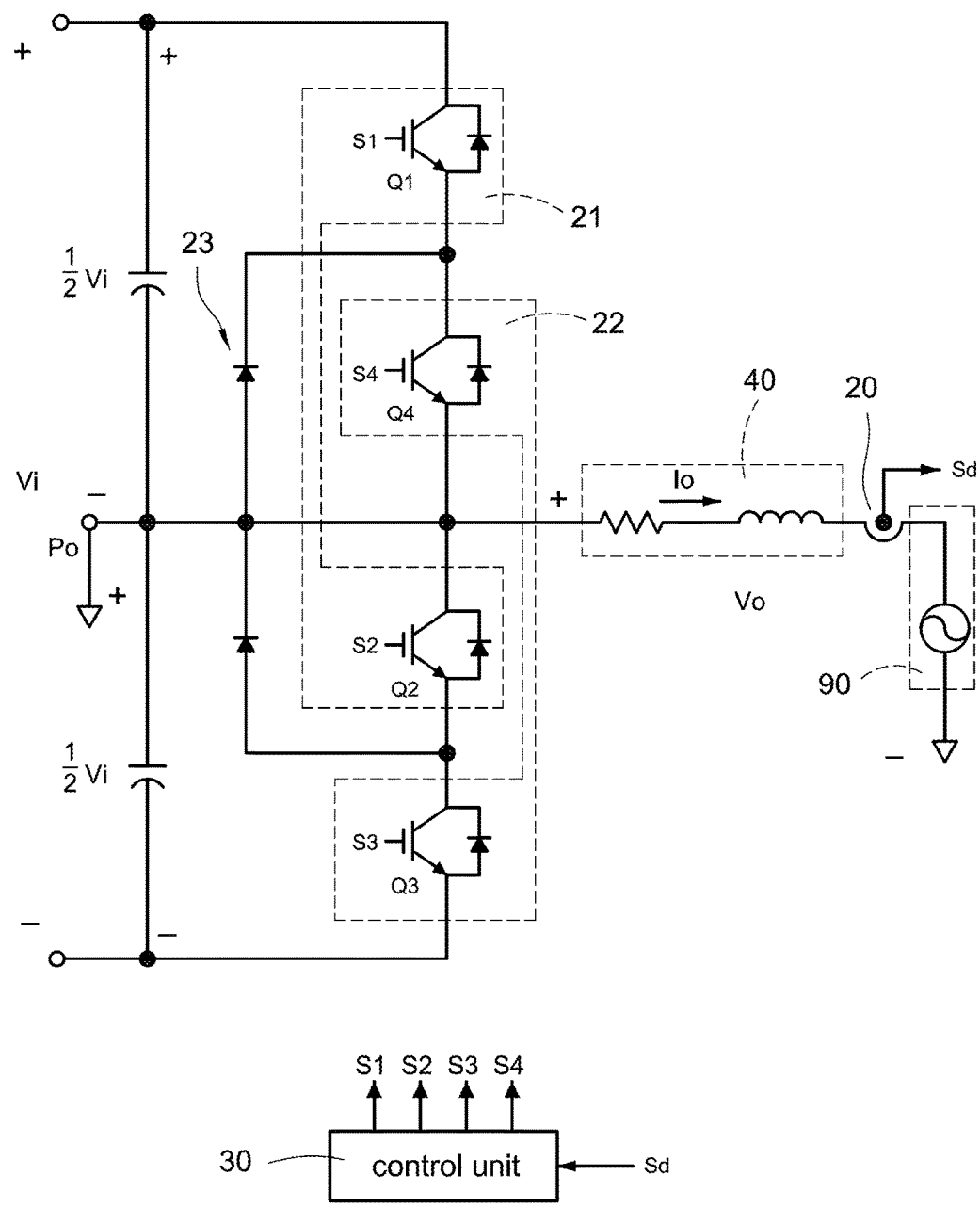
FIG. 9 is a circuit diagram of the inverter apparatus according to a third embodiment of the present disclosure.

As shown in FIG. 9, a third embodiment of the inverter apparatus is a neutral point clamped (NPC) inverter apparatus. The NPC inverter apparatus includes a first switch bridge arm 21, a second switch bridge arm 22, a diode bridge arm 23, a load detection unit 20, and a control unit 30. The first switch bridge arm 21 includes a first switch Q1 and a second switch Q2, and the second switch bridge arm 22 includes a third switch Q3 and a fourth switch Q4. One end of the diode bridge arm 23 is coupled to a common-connected point of the first switch Q1 and the fourth switch Q4, and the other end of the diode bridge arm 23 is coupled to a common-connected point of the second switch Q2 and the third switch Q3. The AC output voltage Vo is provided between a common-connected point of the second switch Q2 and the fourth switch Q4 and a ground point.

When determining the efficiency optimization control is required according to the operation state of the load 90, the control unit 30 controls one switch of the first switch assembly to be high-frequency switched and the other switch of the first switch assembly to be low-frequency turned on, and two switches of the second switch assembly to be turned off, or one switch of the second switch assembly to be high-frequency switched and the other switch of the second switch assembly to be low-frequency turned on, and two switches of the first switch assembly to be turned off, as shown in FIG. 6.

Figure 10:
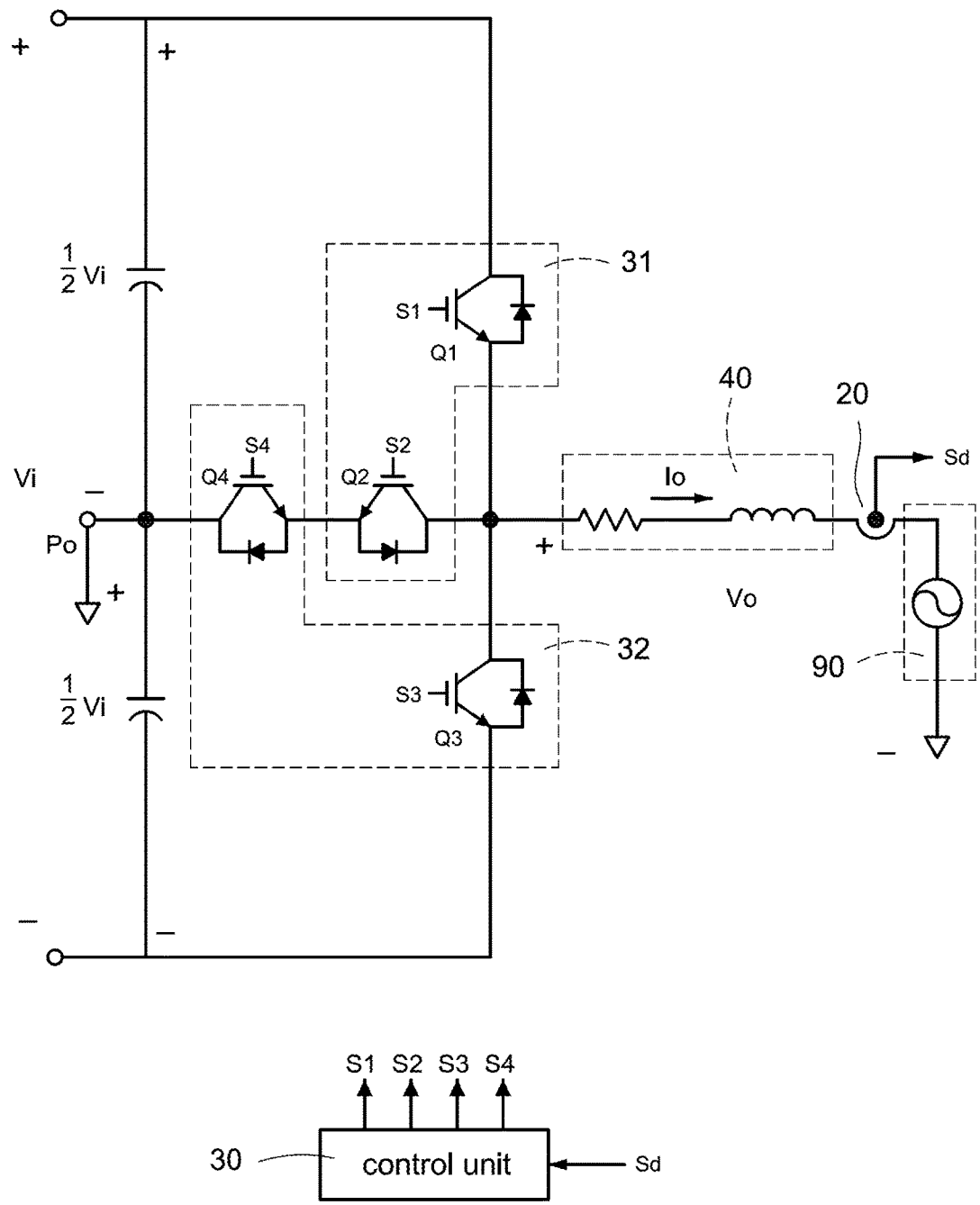
FIG. 10 is a circuit diagram of the inverter apparatus according to a fourth embodiment of the present disclosure.

As shown in FIG. 10, a fourth embodiment of the inverter apparatus is a T-type neutral point clamped (T-type NPC) inverter apparatus. The T-type NPC inverter apparatus includes a first switch bridge arm 31, a second switch bridge arm 32, a load detection unit 20, and a control unit 30. The first switch bridge arm 31 is coupled to the second switch bridge arm 32. The first switch bridge arm 31 includes a first switch Q1 and a second switch Q2, and the second switch bridge arm 32 includes a third switch Q3 and a fourth switch Q4. The AC output voltage Vo is provided between a common-connected point of the first switch Q1, the second switch Q2, and the third switch Q3 and a ground point.

When determining the efficiency optimization control is required according to the operation state of the load 90, the control unit 30 controls one switch of the first switch assembly to be high-frequency switched and the other switch of the first switch assembly to be low-frequency turned on, and two switches of the second switch assembly to be turned off, or one switch of the second switch assembly to be high-frequency switched and the other switch of the second switch assembly to be low-frequency turned on, and two switches of the first switch assembly to be turned off, as shown in FIG. 6.

In particular, the switch control strategies shown in FIG. 2 to FIG. 7B can be applied to the full-bridge inverter apparatus shown in FIG. 1; the switch control strategies shown in FIG. 5 and FIG. 6 can be applied to the NPC inverter apparatus shown in FIG. 9 and the T-type NPC inverter apparatus shown in FIG. 10; the switch control strategies shown in FIG. 3D, FIG. 4A, FIG. 6, FIG. 7A, and FIG. 7B can be applied to the inverter apparatus of the AC-to-AC conversion apparatus with three-leg structure shown in FIG. 8.

In summary, in order to provide interactive controls between different PWM modulations in response to different load operation states, the main principle of the efficiency-optimized switch control is: in the positive-half cycle operation, two control signals for controlling two switches of the first switch assembly are maintained and at least one of two control signals for controlling the two switches of the second switch assembly is turned off; in the negative-half cycle operation, two control signals for controlling two switches of the second switch assembly are maintained and at least one of two control signals for controlling the two switches of the first switch assembly is turned off. Alternatively, in the positive-half cycle operation, two control signals for controlling two switches of the second switch assembly are maintained and at least one of two control signals for controlling the two switches of the first switch assembly is turned off; in the negative-half cycle operation, two control signals for controlling two switches of the first switch assembly are maintained and at least one of two control signals for controlling the two switches of the second switch assembly is turned off.

In particular, for the same type of PWM generation, FIG. 3A-FIG. 3D and FIG. 4A-FIG. 4B are the optimization controls of FIG. 2, FIG. 6 is the optimization control of FIG. 5, and FIG. 7B is the optimization control of FIG. 7A. Actually, it is not limited to change control mode in three-stage manner, two-stage manner, or single-stage manner but according to the operation condition of the load 90. The three-stage manner is, for example but not limited to, from FIG. 2 to FIG. 3A-FIG. 3D, and further to FIG. 4A-FIG. 4B. The two-stage manner is, for example but not limited to, from FIG. 2 to FIG. 4A-FIG. 4B, or from FIG. 3A-FIG. 3D to FIG. 4A-FIG. 4B, or from FIG. 2 to FIG. 3A-FIG. 3D, or from FIG. 5 to FIG. 6, or from FIG. 7A to FIG. 7B. The single-stage manner is that only one of FIG. 2-FIG. 7B is used. In addition, different signal control waveforms shown in FIG. 2-FIG. 7B can be cooperated when the inverter apparatus can normally work, thereby achieving efficiency optimization.

Moreover, the first control signal S1 and the second control signal S2 in FIG. 7A and FIG. 7B modified from FIG. 5 are only in turned-off state or low-frequency turned-on state, i.e., no high-frequency switching state, and therefore the switch elements can be selected and used for reduction of the specification to reduce circuit costs.

Figure 11:
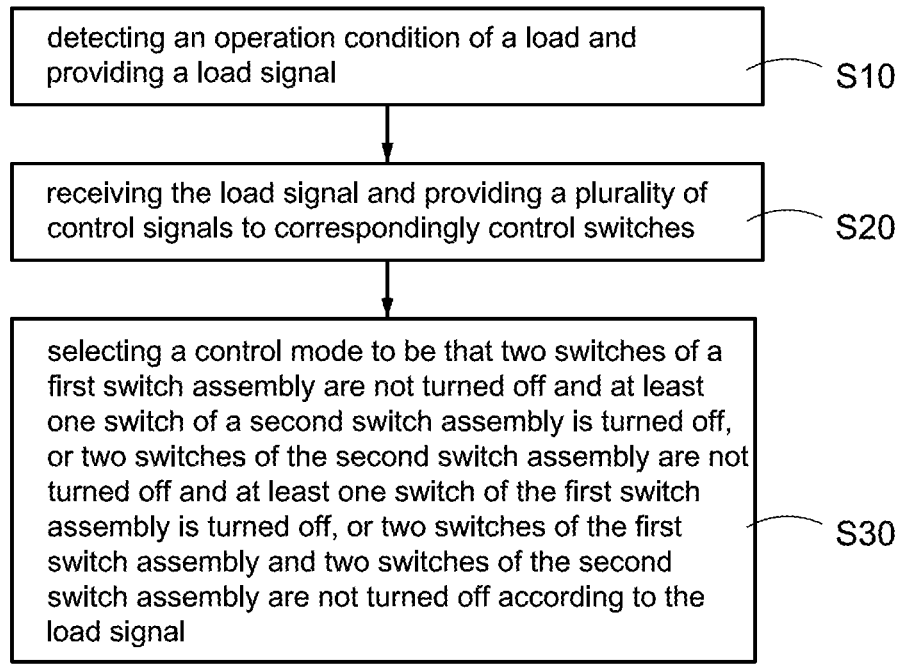
FIG. 11 is a flowchart of a method of controlling an inverter apparatus according to the present disclosure.

Please refer to FIG. 11, which shows a flowchart of a method of controlling an inverter apparatus according to the present disclosure. The method can be applied to the full-bridge inverter apparatus, the inverter apparatus of the AC-to-AC conversion apparatus with three-leg structure, the NPC inverter apparatus, and the T-type NPC inverter apparatus.

The control method includes the following steps. First, detecting an operation condition of a load and providing a load signal (S10). Afterward, receiving the load signal and providing a plurality of control signals to correspondingly control switches (S20). Finally, selecting a control mode to be that two switches of a first switch assembly are not turned off and at least one switch of a second switch assembly is turned off, or two switches of the second switch assembly are not turned off and at least one switch of the first switch assembly is turned off, or two switches of the first switch assembly and two switches of the second switch assembly are not turned off according to the load signal (S30).

Figure 12:
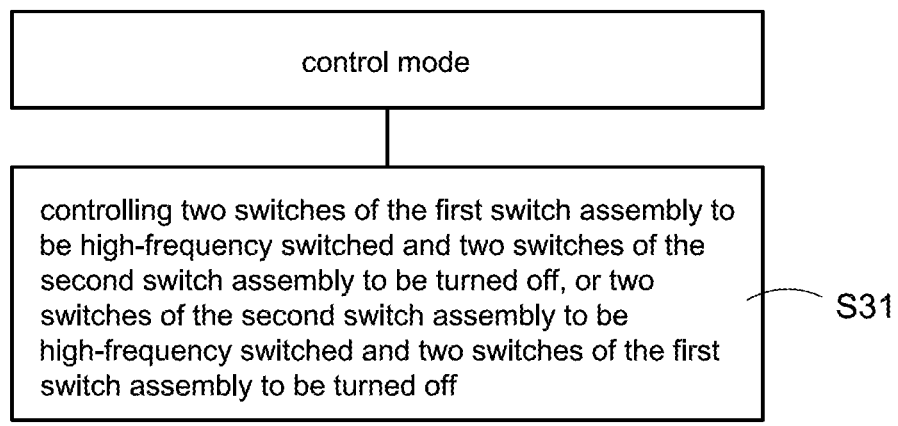
FIG. 12 is a flowchart of a control mode of operating the inverter apparatus according to a first embodiment of the present disclosure.

As shown in FIG. 12, the control mode in the step (S30) includes a step of: controlling two switches of the first switch assembly to be high-frequency switched and two switches of the second switch assembly to be turned off, or two switches of the second switch assembly to be high-frequency switched and two switches of the first switch assembly to be turned off (S31). The detailed description may refer to FIG. 4A and FIG. 4B.

Figure 13:
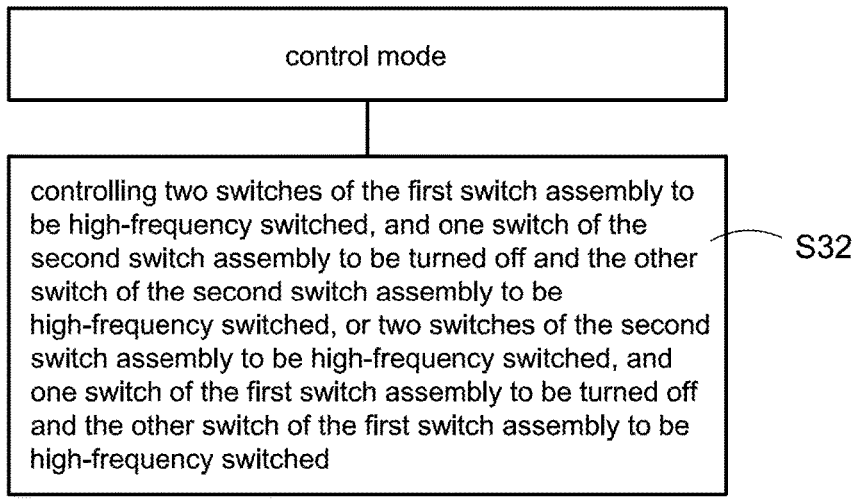
FIG. 13 is a flowchart of the control mode of operating the inverter apparatus according to a second embodiment of the present disclosure.

As shown in FIG. 13, the control mode in the step (S30) includes a step of: controlling two switches of the first switch assembly to be high-frequency switched, and one switch of the second switch assembly to be turned off and the other switch of the second switch assembly to be high-frequency switched, or two switches of the second switch assembly to be high-frequency switched, and one switch of the first switch assembly to be turned off and the other switch of the first switch assembly to be high-frequency switched (S32). The detailed description may refer to FIG. 3A-FIG. 3D.

Figure 14:
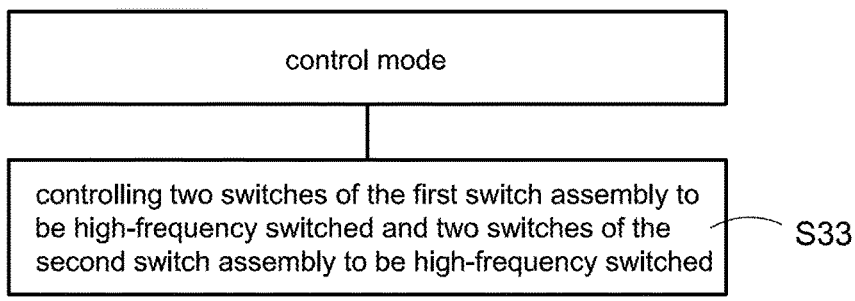
FIG. 14 is a flowchart of the control mode of operating the inverter apparatus according to a third embodiment of the present disclosure.

As shown in FIG. 14, the control mode in the step (S30) includes a step of: controlling two switches of the first switch assembly to be high-frequency switched and two switches of the second switch assembly to be high-frequency switched (S33). The detailed description may refer to FIG. 2.

Figure 15:
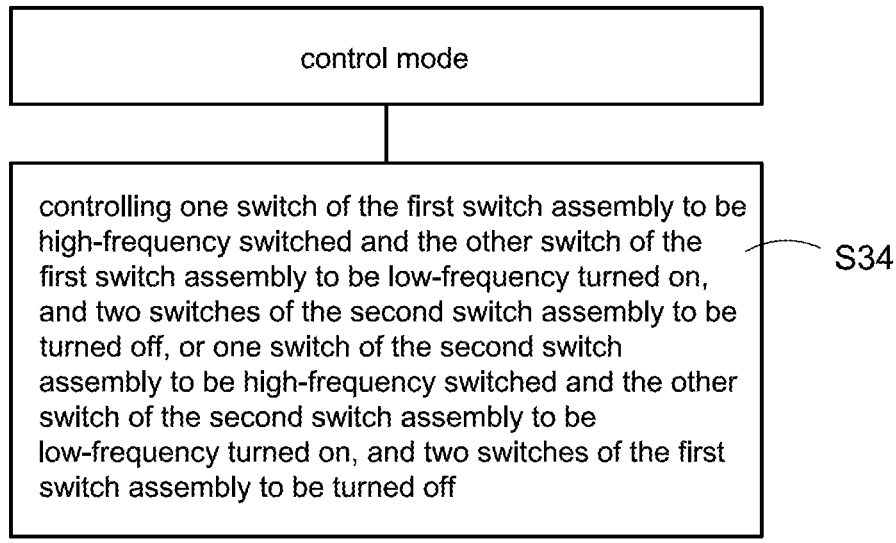
FIG. 15 is a flowchart of the control mode of operating the inverter apparatus according to a fourth embodiment of the present disclosure.

As shown in FIG. 15, the control mode in the step (S30) includes a step of: controlling one switch of the first switch assembly to be high-frequency switched and the other switch of the first switch assembly to be low-frequency turned on, and two switches of the second switch assembly to be turned off, or one switch of the second switch assembly to be high-frequency switched and the other switch of the second switch assembly to be low-frequency turned on, and two switches of the first switch assembly to be turned off (S34). The detailed description may refer to FIG. 6 and FIG. 7B.

Figure 16:
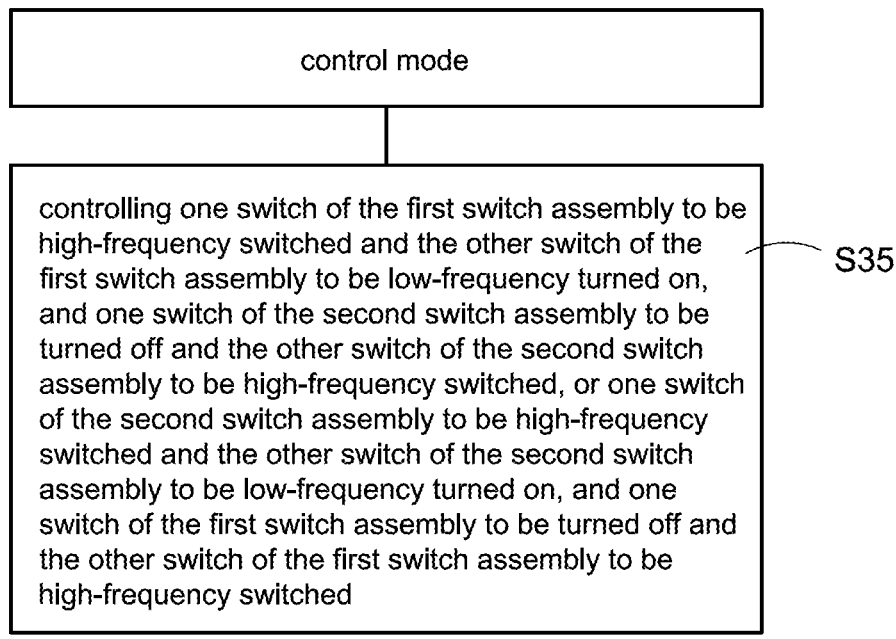
FIG. 16 is a flowchart of the control mode of operating the inverter apparatus according to a fifth embodiment of the present disclosure.

As shown in FIG. 16, the control mode in the step (S30) includes a step of: controlling one switch of the first switch assembly to be high-frequency switched and the other switch of the first switch assembly to be low-frequency turned on, and one switch of the second switch assembly to be turned off and the other switch of the second switch assembly to be high-frequency switched, or one switch of the second switch assembly to be high-frequency switched and the other switch of the second switch assembly to be low-frequency turned on, and one switch of the first switch assembly to be turned off and the other switch of the first switch assembly to be high-frequency switched (S35). The detailed description may refer to FIG. 5 and FIG. 7A.

In conclusion, the inverter apparatus and the method of controlling the same are provided to effectively reduce switching losses of switch elements, increase overall efficiency, and meet the requirement of low total harmonic distortion.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An inverter apparatus configured to convert a DC input voltage into an AC output voltage for supplying power to a load, the inverter apparatus comprising:
   a first switch, a second switch, a third switch, and a fourth switch, wherein the first switch and the fourth switch form a first switch assembly, and the second switch and the third switch form a second switch assembly;
   a load detection unit configured to detect an operation condition of the load and provide a load signal; and
   a control unit configured to receive the load signal and provide a plurality of control signals to correspondingly control the switches;
   wherein the control unit is configured to select a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off according to the load signal, wherein the control signals are produced by comparing a first modulation wave and a second modulation wave with a carrier wave having a zero minimum value.

2. The inverter apparatus of claim 1, wherein the control mode is that one switch of the first switch assembly is high-frequency switched and the other switch of the first switch assembly is low-frequency turned on, and two switches of the second switch assembly are turned off, or one switch of the second switch assembly is high-frequency switched and the other switch of the second switch assembly is low-frequency turned on, and two switches of the first switch assembly are turned off.

3. The inverter apparatus of claim 1, wherein the control mode is that one switch of the first switch assembly is high-frequency switched and the other switch of the first switch assembly is low-frequency turned on, and one switch of the second switch assembly is turned off and the other switch of the second switch assembly is high-frequency switched, or one switch of the second switch assembly is high-frequency switched and the other switch of the second switch assembly is low-frequency turned on, and one switch of the first switch assembly is turned off and the other switch of the first switch assembly is high-frequency switched.

4. The inverter apparatus of claim 1, wherein the first switch and the second switch form a first switch bridge arm, and the third switch and the fourth switch form a second switch bridge arm; the first switch bridge arm is coupled in parallel to the second switch bridge arm;
   wherein the AC output voltage is provided between a common-connected point of the first switch and the second switch and a common-connected point of the third switch and the fourth switch.

5. The inverter apparatus of claim 1, further comprising:
   a diode bridge arm, one end of the diode bridge arm coupled to a common-connected point of the first switch and the fourth switch, the other end of the diode bridge arm coupled to a common-connected point of the second switch and the third switch;
   wherein the AC output voltage is provided between a common-connected point of the second switch and the fourth switch and a ground point.

6. The inverter apparatus of claim 1, wherein the first switch and the second switch form a first switch bridge arm, and the third switch and the fourth switch form a second switch bridge arm; the first switch bridge arm is coupled to the second switch bridge arm;
   wherein the AC output voltage is provided between a common-connected point of the first switch, the second switch, and the third switch and a ground point.

7. A method of controlling an inverter apparatus, the inverter apparatus configured to convert a DC input voltage into an AC output voltage for supplying power to a load, and the inverter apparatus comprising a first switch, a second switch, a third switch, and a fourth switch, wherein the first switch and the fourth switch form a first switch assembly, and the second switch and the third switch form a second switch assembly, the method of controlling the inverter apparatus comprising steps of:
   (a) detecting an operation condition of the load and providing a load signal;
   (b) receiving the load signal and providing a plurality of control signals to correspondingly control the switches; and (c) selecting a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off according to the load signal, wherein the control signals are produced by comparing a first modulation wave and a second modulation wave with a carrier wave having a zero minimum value.

8. The method of controlling the inverter apparatus of claim 7, wherein the control mode in step (c) comprises a step of:

controlling one switch of the first switch assembly to be high-frequency switched and the other switch of the first switch assembly to be low-frequency turned on, and two switches of the second switch assembly to be turned off, or one switch of the second switch assembly to be high-frequency switched and the other switch of the second switch assembly to be low-frequency turned on, and two switches of the first switch assembly to be turned off.

9. The method of controlling the inverter apparatus in claim 7, wherein the control mode in step (c) comprises a step of:

controlling one switch of the first switch assembly to be high-frequency switched and the other switch of the first switch assembly to be low-frequency turned on, and one switch of the second switch assembly to be turned off and the other switch of the second switch assembly to be high-frequency switched, or one switch of the second switch assembly to be high-frequency switched and the other switch of the second switch assembly to be low-frequency turned on, and one switch of the first switch assembly to be turned off and the other switch of the first switch assembly to be high-frequency switched.

10. An inverter apparatus configured to convert a DC input voltage into an AC output voltage for supplying power to a load, the inverter apparatus comprising:

a first switch, a second switch, a third switch, and a fourth switch, wherein the first switch and the fourth switch form a first switch assembly, and the second switch and the third switch form a second switch assembly;

a load detection unit configured to detect an operation condition of the load and provide a load signal; and a control unit configured to receive the load signal and provide a plurality of control signals to correspondingly control the switches;

wherein the control unit is configured to select a control mode to be that two switches of the first switch assembly are not turned off and at least one switch of the second switch assembly is turned off, or two switches of the second switch assembly are not turned off and at least one switch of the first switch assembly is turned off, or two switches of the first switch assembly and two switches of the second switch assembly are not turned off according to the load signal, wherein the control signals are produced by comparing a first modulation wave and a second modulation wave with a carrier wave having positive and negative values symmetrical to a zero value.

11. The inverter apparatus of claim 10, wherein the control mode is that two switches of the first switch assembly are high-frequency switched and two switches of the second switch assembly are turned off, or two switches of the second switch assembly are high-frequency switched and two switches of the first switch assembly are turned off.

12. The inverter apparatus of claim 10, wherein the control mode is that two switches of the first switch assembly are high-frequency switched, and one switch of the second switch assembly is turned off and the other switch of the second switch assembly is high-frequency switched, or two switches of the second switch assembly are high-frequency switched, and one switch of the first switch assembly is turned off and the other switch of the first switch assembly is high-frequency switched.

13. The inverter apparatus of claim 1, wherein the control mode is that two switches of the first switch assembly are high-frequency switched and two switches of the second switch assembly are high-frequency switched.

\* \* \* \* \*